(No Model.)
F. M. STEVENS.
VALVE GEAR FOR LOCOMOTIVES.
No. 548,597. Patented Oct. 22, 1895.
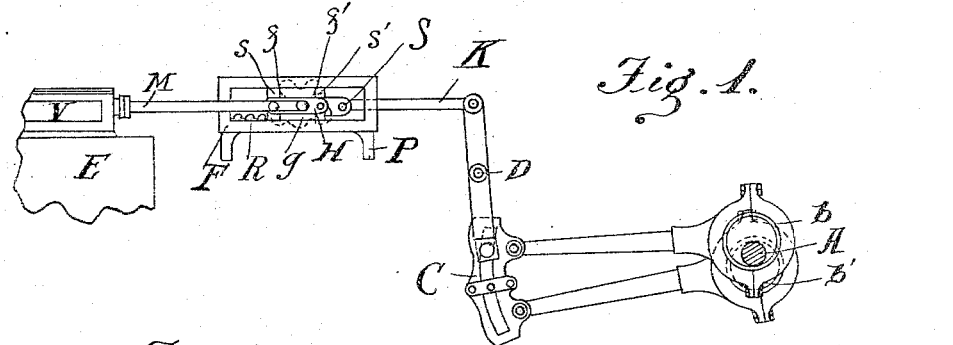
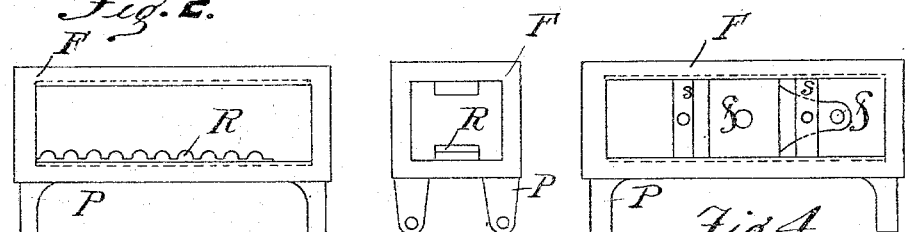
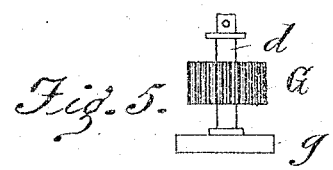
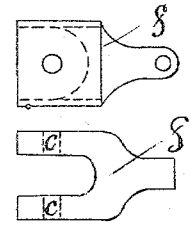
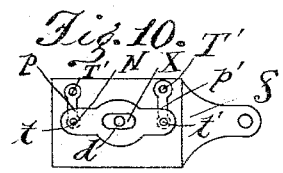
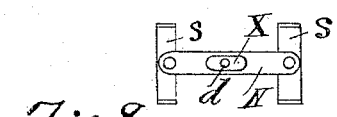
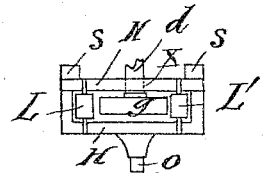
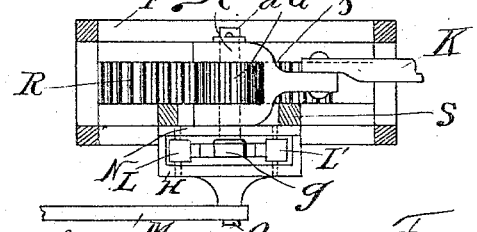
Witnesses:
A. R. Appleman, Jr.
R. Caldwell.
Inventor:
Frank M. Stevens
Geo. H. Holgate, atty

UNITED STATES PATENT OFFICE.

FRANK M. STEVENS, OF PHILADELPHIA, PENNSYLVANIA, ASSIGNOR TO STEPHEN V. GODDEN, OF SAME PLACE.

VALVE-GEAR FOR LOCOMOTIVES.

SPECIFICATION forming part of Letters Patent No. 548,597, dated October 22, 1895.

Application filed February 16, 1894. Serial No. 500,428. (No model.)

*To all whom it may concern:*

Be it known that I, FRANK M. STEVENS, a citizen of the United States, residing at Philadelphia, in the county of Philadelphia and State of Pennsylvania, have invented a new Intermediate or Auxiliary Valve-Gear, of which the following is a specification.

My invention relates to an improvement on the old style of valve-gear as commonly used on locomotives, stationary or marine engines, using either steam, gas in air, or other agent as a source of power; and the objects of my invention are, first, to provide for securing greater economy in the use of steam, gas in air, or whatever agent may be used as the prime mover or power; second, to overcome or reduce to the lowest maximum degree the back-pressure so prevalent in all engines of ordinary type; third, to surely prevent "wire drawing," a fault now so commonly occurring in most engines; fourth, to increase the general efficiency of the engine and thereby rendering the development of power considerably greater with the same amount of steam or other agent used, and, fifth, the securing of a resulting saving of fuel and power.

To accomplish the purposes of my invention I interpose at some convenient point between the prime mover of the valve (usually a cam or crank) an auxiliary or secondary valve-gear, so constructed that I convert the ordinary or common uniform reciprocating motions given by the prime mover into a variable or intermittent reciprocating motion, and which motion I transmit to the valve by connection with the valve-rod.

My invention consists of a block that slides in a guide or frame, in combination with the other mechanism to be hereinafter set forth and specifically claimed. This block carries a shaft on which a cam and gear or segment of gear are mounted.

A frame runner or guide is provided with a fixed rack on its base or top to engage with a gear or segment. This frame runner or guide is fixed rigidly to the frame or bed plate of the engine and carries the block that slides in the frame runners or guides. This block carries a shaft on which a cam and gear or segment of gear are mounted. The construction of the block provides a bearing on each side of the gear or segment of gear, thereby insuring a perfect alignment of the gear or segment of gear with the rack. As the block is pushed to and fro by the motions of the rocker-arm, the gear or segment of gear on the shaft carried by the block engages with the fixed rack on the base or top of the frame runners or guides and imparts to the cam on the same shaft with the gear or segment of gear a rotating reciprocating motion. The cam is embraced by a yoke attached to the valve-rod. This yoke is carried by two yoke-blocks, which slide in the same frame runners or guides which carry the block. This yoke has a roller at each end of the yoke-frame embracing the cam, and as the cam receives its rotating reciprocating motion from the gear or segment of gear, imparted by its passage to and fro over the rack, the cam, by its movements against the rollers in the yoke, produces and gives to the yoke directly connected with the valve-rod a variable movement, and this same movement is given to the valve, the amount of variation depending on the shape of the cam.

In my drawings I have shown an irregular-faced cam. By using the cam of this construction I am enabled to vary the distribution of steam or other agent employed as the prime mover or power by simply detaching the cam and substituting another of a different size or shape, and to adapt any locomotive to any kind of service—such as freight, passenger, and fast or slow trains.

I attain the objects of my invention, as described, by the mechanism or attachment shown in the accompanying drawings, where, for illustration and to more clearly describe and explain the practical operation of my invention, I have confined my drawings and description as would be adaptable and applied to the common steam-locomotive now in general use; but I wish it understood that my invention is applicable to almost any engine—stationary, marine, or others.

Figure 1 shows a side elevation of the valve-gear for one side of a locomotive with my invention interposed between the arm and the valve, connection being made to the valve-rod. Fig. 2 shows an enlarged side elevation of the frame runners or guides and rack at its base. Fig. 3 is an end elevation of the frame runners or guides, with rack in center at base. Fig. 4 is a side elevation of the frame runners or guides, showing the sliding cam-block in its normal position in the frame runners or guides and the sliding yoke-blocks that carry the yoke, but the yoke is not shown here. Fig. 5 shows a plan of the shaft, gear or segment of gear, and cam. Fig. 6 is a side elevation and plan of the sliding block, having two or more bearings, that carries the gear or segment of gear and cam. Fig. 7 is a side elevation of the irregular cam, and showing the rollers of the yoke-frame embracing it. Fig. 8 is a side elevation of the inner side of yoke-frame and attached to the sliding yoke-blocks. Fig. 9 shows a general plan of the sliding yoke-frame, with rollers and cam in position, and the outside connecting-pin for the valve-rod. Fig. 10 is a side elevation of the sliding block, showing a modification of the yoke, which is attached by two swinging links directly to the block, thereby dispensing with the independent sliding yoke-blocks. Fig. 11 is a plan view of the valve-gear.

Similar letters refer to the same parts throughout the various figures.

In Fig. 1, A is the driving-axle of the locomotive; b and b', eccentrics or cams, (one for going ahead and one for backing up;) C, the common well-known reversing-link; D, rocker shaft and arms; E, the engine-cylinder; V, the slide-valve; F, the cam-frame runners or guides, which carry the sliding block f f' and the sliding yoke-blocks s s', and which have the rack R at their base or top. H is the sliding yoke that embraces the cam g and partakes of its motions by the pressure of the cam g against the rollers L L' in the yoke H. K is a part of the valve-rod, as also is the rod M.

In Fig. 2, R is the rack, F the cam frame or guides, and P lugs or flanges by which the cam-frame F is secured to the frame or bed plate of the engine.

Fig. 3 shows end elevation of Fig. 2.

Fig. 4 shows the sliding block f in its position on the cam frame or guides F and also the sliding yoke-blocks s s', which carry the yoke H. (See, also, Fig. 9.)

Fig. 5 is a plan of the shaft d, which is carried by the sliding block f (see Figs. 4 and 6) and on which is the gear G and the cam g.

Fig. 6 is a side elevation of the sliding block f and a plan showing the bearings c c', which carry the shaft d and gear or segment of gear G and the irregular cam g.

In Fig. 7, g shows side elevation of the irregular cam and the rollers L L' in their relative positions to the cam g. (See, also, Fig. 9.)

In Fig. 8, s s are the sliding cam-blocks, as also shown in Figs. 1, 4, and 9. N is the inner side of the sliding yoke H, as shown in Figs. 1 and 9, having an elongated opening X to allow room for the reciprocating motion of the shaft d. (See, also, Figs. 5 and 9.)

The sliding yoke H, Fig. 9, carries the rollers L L', so placed as to embrace the cam g on each side, and thereby partaking of its reciprocating motions and actuating the valve-rod M (see Fig. 1) by its connecting-pivot o.

Fig. 10 shows the modification of dispensing with the sliding yoke-blocks s s', as shown in Figs. 4, 8, and 9, and substituting the swinging links p p', pivoted on the sliding block f by the pivots or pins T and T' and connected to the reciprocating yoke H by the pivots or pins t t'.

What I claim as my invention, and desire to secure by Letters Patent, is—

1. In an auxiliary valve gear for locomotives or other engines, the combination of the sliding block f with the shaft d, carrying a gear wheel or segment of gear G, actuated by the rack R, and imparting a rotary and reciprocating motion to the cam g, and operating the valve rod M of the slide valve V, by its connecting pivot o for the purpose specified and substantially as shown and described.

2. In an auxiliary valve gear for locomotives or other engines, the combination of the cam frame runners or guides F, with the rack R, at its base or top part, engaging with the gear wheel or segment of gear G, and imparting a rotary motion to the cam g, and operating the valve rod M and slide valve V by its connecting pivot o, substantially as shown and described.

3. In an auxiliary valve gear for locomotives or other engines, the combination of the sliding block f, having two or more bearings c c', carrying the shaft d, the gear G, or its equivalent, and the irregular cam g, the said cam being operated by a gear or segment and rack, or their equivalent, all arranged to operate substantially as described.

In testimony whereof I affix my signature in the presence of two witnesses.

FRANK M. STEVENS.

Witnesses:
GEO. H. HOLGATE,
E. P. EADSON.